US011064096B2

(12) United States Patent
Sauermann

(10) Patent No.: US 11,064,096 B2
(45) Date of Patent: Jul. 13, 2021

(54) FILTERING AND SMOOTHING SOURCES IN CAMERA TRACKING

(71) Applicants: Sony Corporation, Tokyo (JP); Sony Pictures Entertainment Inc., Culver City, CA (US)

(72) Inventor: Felix Sauermann, Lawndale, CA (US)

(73) Assignees: Sony Corporation, Tokyo (JP); Sony Pictures Entertainment, Inc., Culver City, CA (US)

( * ) Notice: Subject to any disclaimer, the term of this patent is extended or adjusted under 35 U.S.C. 154(b) by 0 days.

(21) Appl. No.: 16/990,274

(22) Filed: Aug. 11, 2020

(65) Prior Publication Data
US 2021/0185191 A1 Jun. 17, 2021

Related U.S. Application Data

(60) Provisional application No. 62/947,702, filed on Dec. 13, 2019.

(51) Int. Cl.
*H04N 5/222* (2006.01)
*H04N 17/00* (2006.01)

(52) U.S. Cl.
CPC ......... *H04N 5/2228* (2013.01); *H04N 17/002* (2013.01)

(58) Field of Classification Search
CPC .. H04N 13/96; H04N 13/246; H04N 21/8547; H04N 5/2228; H04N 17/00; G06T 7/85
See application file for complete search history.

(56) References Cited

U.S. PATENT DOCUMENTS

| 7,860,301 | B2 * | 12/2010 | Se ......................... | G01C 11/06 |
| | | | | 382/154 |
| 9,161,019 | B2 * | 10/2015 | Millett ................... | H04N 13/25 |
| 9,565,419 | B2 | 2/2017 | Presler | |
| 10,477,188 | B2 * | 11/2019 | Stiglic .................. | H04N 13/156 |
| 10,552,014 | B2 * | 2/2020 | Densham ............. | H04N 9/3185 |
| 10,791,319 | B1 * | 9/2020 | Chui ...................... | G06T 17/00 |
| 2006/0221072 | A1 * | 10/2006 | Se .......................... | G06T 7/593 |
| | | | | 345/420 |

(Continued)

*Primary Examiner* — Brian P Yenke
(74) *Attorney, Agent, or Firm* — Procopio, Cory, Hargreaves & Savitch LLP

(57) ABSTRACT

Video processing, including: generating first tracking information using a first tracking system coupled to a camera which moves during a video sequence forming a shot including multiple frames, wherein the first tracking information includes information about six degrees of freedom motion of the camera synchronized to the multiple frames in the shot; generating second tracking information using a second tracking system coupled to the camera which moves during the video sequence, wherein the second tracking information includes information about six degrees of freedom motion of the camera synchronized to the multiple frames in the shot; generating, by a tracking tool, a timeline with a first track for the first tracking information and a second track for the second tracking information, wherein the tracking tool is coupled to the first tracking system and the second tracking system, and receives the first tracking information and the second tracking information.

20 Claims, 5 Drawing Sheets

(56) References Cited

U.S. PATENT DOCUMENTS

| | | | |
|---|---|---|---|
| 2008/0089556 A1* | 4/2008 | Salgian | G06K 9/209 382/103 |
| 2008/0212835 A1* | 9/2008 | Tavor | G06K 9/32 382/103 |
| 2013/0307934 A1* | 11/2013 | Densham | G03B 31/00 348/46 |
| 2015/0116413 A1* | 4/2015 | Duke | B41J 29/393 347/19 |
| 2015/0161818 A1* | 6/2015 | Komenczi | H04N 13/25 348/43 |
| 2016/0086336 A1* | 3/2016 | Lin | H04N 13/282 348/50 |
| 2016/0140733 A1* | 5/2016 | Gu | H04N 13/172 348/43 |
| 2017/0078447 A1* | 3/2017 | Hancock | G06F 1/3215 |
| 2017/0244956 A1* | 8/2017 | Stiglic | H04N 5/232 |
| 2019/0066387 A1 | 2/2019 | Grossmann et al. | |
| 2019/0098217 A1* | 3/2019 | Zhou | H04N 5/23258 |
| 2019/0158813 A1* | 5/2019 | Rowell | H04N 13/189 |
| 2019/0260929 A1* | 8/2019 | Kaneko | H04N 5/04 |
| 2019/0287302 A1* | 9/2019 | Bhuruth | G06F 3/04847 |
| 2019/0356885 A1* | 11/2019 | Ribeiro | G06T 7/70 |
| 2020/0134856 A1* | 4/2020 | Chapman | G08B 6/00 |
| 2020/0250357 A1* | 8/2020 | Stevenson | G09B 5/065 |
| 2020/0413090 A1* | 12/2020 | Zhu | H04N 19/527 |

* cited by examiner

FILTERING AND SMOOTHING SOURCES IN CAMERA TRACKING

CROSS-REFERENCE TO RELATED APPLICATIONS

This application claims the benefit of priority under 35 U.S.C. § 119(e) of U.S. Provisional Patent Application No. 62/947,702, filed Dec. 13, 2019, entitled "Filtering and Smoothing Sources in Camera Tracking." The disclosure of the above-referenced application is incorporated herein by reference.

BACKGROUND

Field

The present disclosure relates to processing video data, and more specifically, to filtering and smoothing sources in camera tracking.

Background

In the conventional system for video production, using single camera tracking system to track spatial coordinates of cameras can cause a video rendering operation to fail when the tracking data drops out or anomalies are created in the tracking data.

SUMMARY

The present disclosure provides for processing video data.

In one implementation, a method for video processing is disclosed. The method includes: generating first tracking information using a first tracking system coupled to a camera which moves during a video sequence forming a shot including multiple frames, wherein the first tracking information includes information about six degrees of freedom motion of the camera synchronized to the multiple frames in the shot; generating second tracking information using a second tracking system coupled to the camera which moves during the video sequence, wherein the second tracking information includes information about six degrees of freedom motion of the camera synchronized to the multiple frames in the shot; and generating, by a tracking tool, a timeline with a first track for the first tracking information and a second track for the second tracking information, wherein the tracking tool is coupled to the first tracking system and the second tracking system, and receives the first tracking information and the second tracking information.

In one implementation, the first tracking system is an optical tracking system. In one implementation, the second tracking system is a hardware-encoded head. In one implementation, mixing the first tracking information of the first track with the second tracking information of the second track into a new master track. In one implementation, the method further includes synchronizing, by the tracking tool, the first tracking information and the second tracking information to a time code. In one implementation, the method further includes generating, by the tracking tool, adjusted tracking information using the synchronized first tracking information of the first track and the synchronized second tracking information of the second track to smooth anomalous data in the first tracking information. In one implementation, generating adjusted tracking information includes generating an adjusted timeline by applying bias to one of the synchronized first tracking information of the first track or the synchronized second tracking information of the second track using keyframes. In one implementation, generating the adjusted timeline includes adjusting the timeline in real-time. In one implementation, generating the adjusted timeline includes adjusting the timeline post production.

In another implementation, a system for video processing is disclosed. The system includes: a camera; a first tracking system, connected to the camera, wherein the first tracking system generates first tracking information about the camera as the camera moves during a video sequence forming a shot includes multiple frames, and the first tracking information includes information about six degrees of freedom motion of the camera synchronized to frames in the shot; a second tracking system, wherein the second tracking system generates second tracking information about the camera as the camera moves during the video sequence, and the second tracking information includes information about six degrees of freedom motion of the camera synchronized to frames in the shot; and a tracking tool connected to the first tracking system and the second tracking system, that receives the first tracking information and the second tracking information, creates a timeline with a first track for the first tracking information and a second track for the second tracking information.

In one implementation, the first tracking system is an optical tracking system. In one implementation, the second tracking system is a hardware encoded head. In one implementation, the system further includes a synchronizing tool to synchronize the first tracking information and the second tracking information to a time code. In one implementation, the system further includes a track manager to generate adjusted tracking information using the synchronized first tracking information and the synchronized second tracking information received from the synchronizing tool to smooth anomalous data in the first tracking information. In one implementation, the system further includes a bias applier to generate an adjusted timeline by applying bias to one of the synchronized first tracking information of the first track or the synchronized second tracking information of the second track using keyframes. In one implementation, the system further includes a mixer to mix the first tracking information of the first track with the second tracking information of the second track into a new master track.

In another implementation, a non-transitory computer-readable storage medium storing a computer program to capture video is disclosed. The computer program includes executable instructions that cause a computer to: generate first tracking information from tracking data received from a first tracking system coupled to a camera which moves during a video sequence forming a shot including multiple frames, wherein the first tracking information includes information about six degrees of freedom motion of the camera synchronized to the multiple frames in the shot; generate second tracking information from tracking data received from a second tracking system coupled to the camera which moves during the video sequence, wherein the second tracking information includes information about six degrees of freedom motion of the camera synchronized to the multiple frames in the shot; and generate a timeline with a first track for the first tracking information and a second track for the second tracking information.

In one implementation, the program further includes executable instructions that cause the computer to synchronize the first tracking information and the second tracking information to a time code. In one implementation, the program further includes executable instructions that cause the computer generate adjusted tracking information using the synchronized first tracking information of the first track and the synchronized second tracking information of the second track to smooth anomalous data in the first tracking information. In one implementation, the program further includes executable instructions that cause the computer to mix the first tracking information of the first track with the second tracking information of the second track into a new master track.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings in which.

DETAILED DESCRIPTION

As described above, using single camera tracking system (in the conventional system for video production) to track spatial coordinates of cameras can cause a video rendering operation to fail when the tracking data drops out or anomalies are created in the tracking data.

Certain implementations of the present disclosure provide for methods and systems to implement a new technique for processing video data. In one implementation, spatial coordinates of cameras are tracked using multiple camera tracking systems and encoders. Thus, using multiple camera tracking systems and/or encoders can help refine tracking accuracy and quality, and also creates redundancy in case one or more of the cameras were to fail.

After reading the below descriptions, it will become apparent how to implement the disclosure in various implementations and applications. Although various implementations of the present disclosure will be described herein, it is understood that these implementations are presented by way of example only, and not limitation. As such, the detailed description of various implementations should not be construed to limit the scope or breadth of the present disclosure.

Features provided in the below implementations can include, but are not limited to, one or more of the following items. For example, in one implementation, multiple tracking data and/or encoder sets are brought into a tool which combines and synchronizes all data streams. The tool presents the data sets as tracks with respective sub-tracks on a timeline. The operator can then choose which parts or tracks of the data to use or to smooth in case of erroneous data. Thus, the tool offers the operator the ability to create a master track from the data sets and to then export the processed data (e.g., in filmbox (FBX) format).

Figure 1:
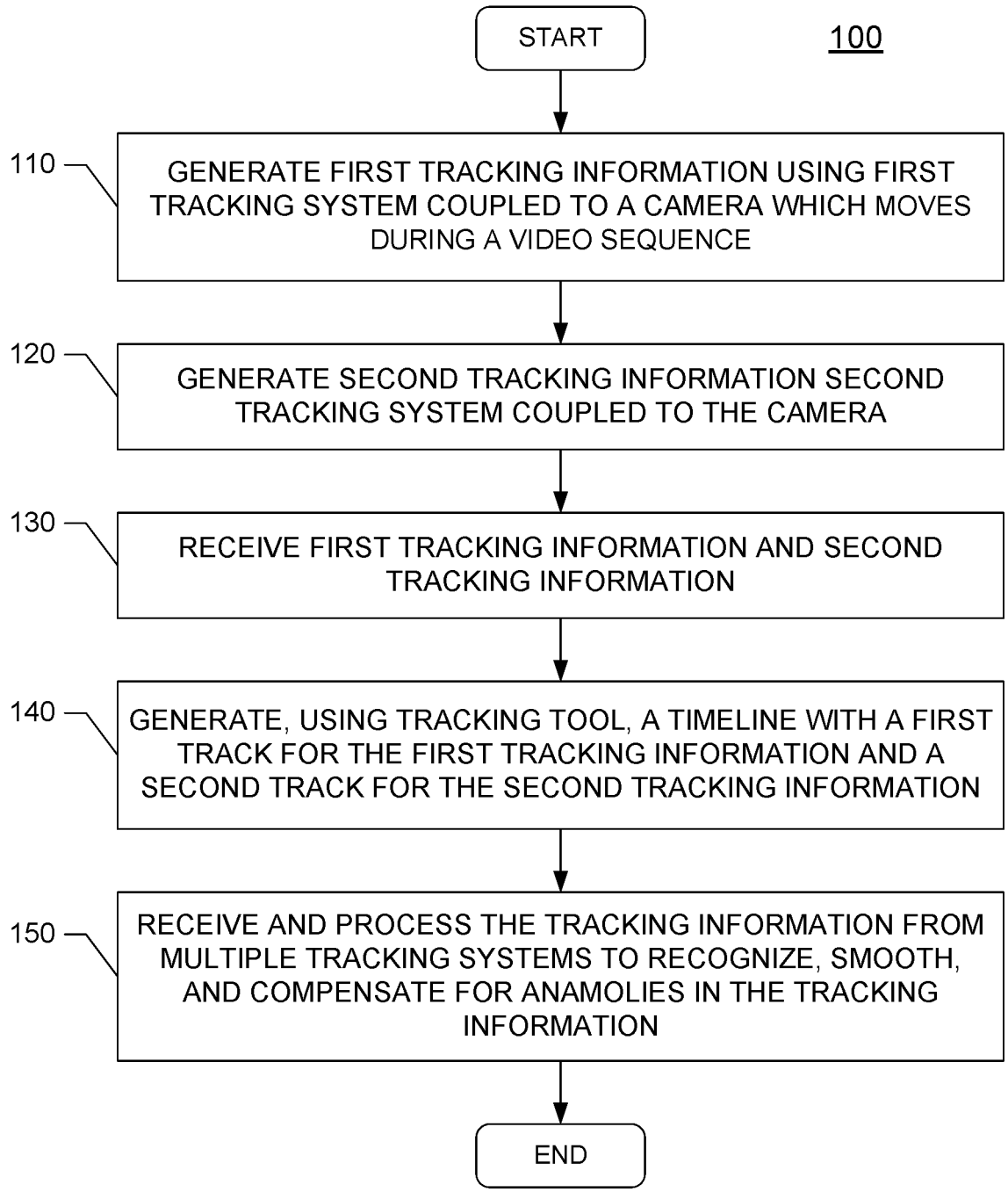
FIG. 1 is a flow diagram of a method for video rendering in accordance with one implementation of the present disclosure.

FIG. 1 is a flow diagram of a method 100 for video rendering in accordance with one implementation of the present disclosure. In the illustrated implementation of FIG. 1, first tracking information is generated, at step 110, by a first tracking system coupled to a camera which moves during a video sequence forming a shot including multiple frames. In one implementation, the first tracking information includes information about six degrees of freedom motion of the camera synchronized to the multiple frames in the shot.

Second tracking information is then generated, at step 120, by a second tracking system coupled to the camera which moves during the video sequence. In one implementation, the second tracking information includes information about six degrees of freedom motion of the camera synchronized to the multiple frames in the shot. The first tracking information and the second tracking information are received, at step 130, and a timeline is then created by a tracking tool, at step 140, with a first track for the first tracking information and a second track for the second tracking information.

In one implementation, the camera is outfitted with a first tracking system (e.g., an optical tracking system) and a second tracking system (e.g., a hardware encoded head). Further, the first tracking system outputs first tracking information about the camera, while the second tracking system outputs second tracking information about the camera. In one implementation, each of the first tracking system and the second tracking system delivers information about the six degrees-of-freedom as well as world offsets for the camera.

Although the tracked data coming from the first tracking system and the second tracking system are generally good, incoming data from one or more of the systems may intermittently drop out or deviate. Thus, the drop out/deviation may otherwise cause problems if a video system relies solely on data from a single tracking system or head. Therefore, the video system includes multiple tracking systems to provide redundancy. The video system also includes a tracking tool (or software) to enable the ingestion of multiple data sets from the multiple tracking systems to generate a timeline with multiple tracks of camera data.

In one implementation, once all of the tracks of the camera track data have been received, the tracking tool synchronizes the camera track data for each track to a time code (or frames per second). At this point, anomalies in the received data can be recognized, smoothed, and compensated for, at step 150, with the camera track data from the other tracks, or dismissed entirely. All tracks and sub-tracks also can be freely mixed into a new master track via a software solution. This also enables a bias to be applied to any one of the tracks using keyframes or other similar technique. Further, in one implementation, the above-described technique is employable for both live (i.e., real-time) and post-production. In another implementation, there is no limit on the number of tracking systems used in combination. In an alternative implementation, various kinds of tracking system or mechanisms can be used. Any system that gives the user information about the position and rotation of the capture camera can be employed to provide additional tracking information.

Figure 2A:
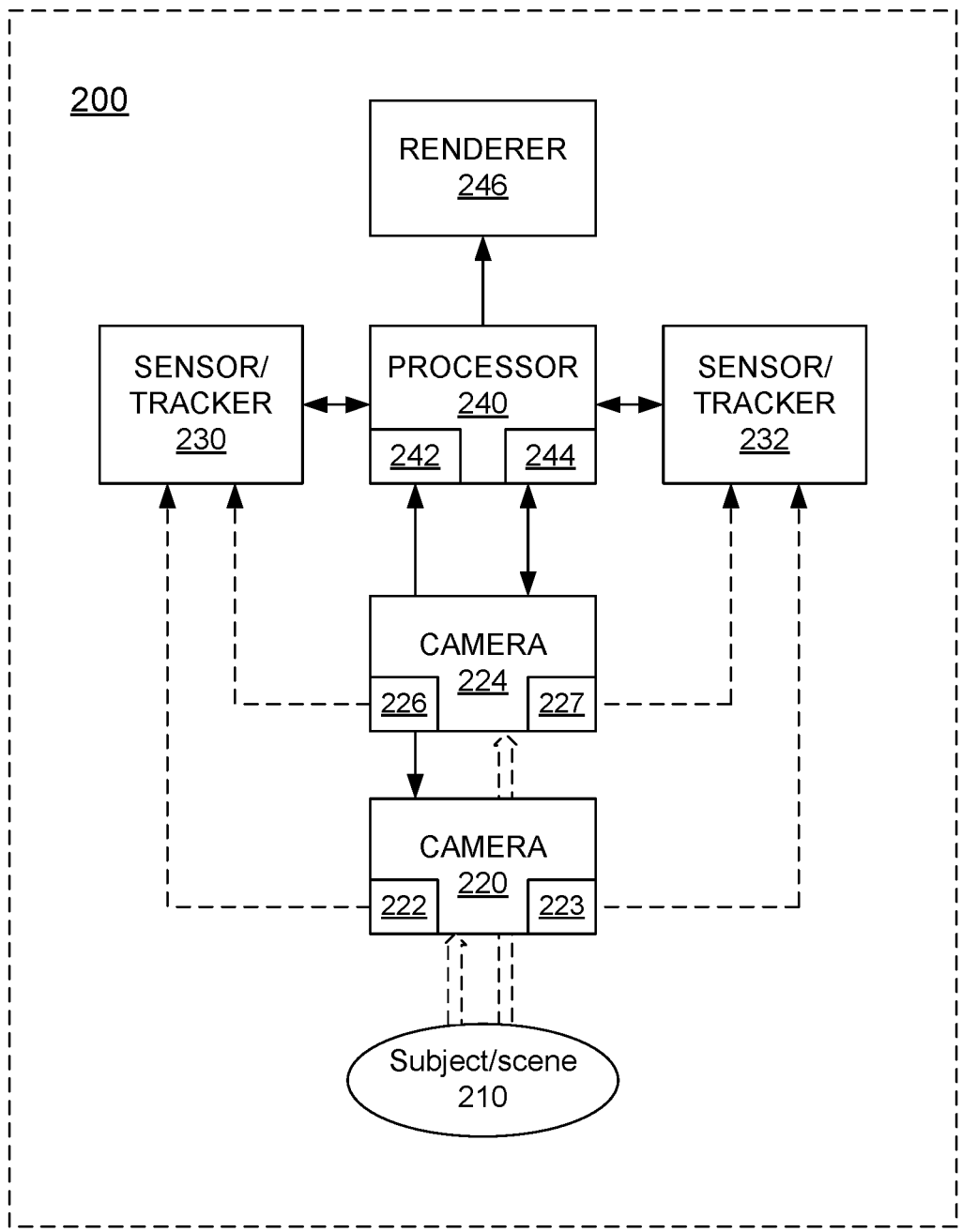
FIG. 2A is a block diagram of a video system in accordance with one implementation of the present disclosure.

FIG. 2A is a block diagram of a video system 200 in accordance with one implementation of the present disclosure. In the illustrated implementation of FIG. 2A, the video system 200 is used in a video production or studio environment. The system 200 includes one or more cameras 220, 224 for image capture of subject and/or scene 210, one or more sensors/trackers 230, 232 to track the spatial coordinates (e.g., position and orientation) of the cameras, and a processor 240 to process the camera and sensor data. Thus, in one implementation, the system 200 uses two camera trackers 230, 232 to create two data sets for each camera, for a total of four track data sets.

In the illustrated implementation of FIG. 2A, each of the trackers 230, 232 tracks spatial coordinates of the cameras 220, 224 during a video sequence that forms a shot having multiple frames. In one implementation, the spatial coordinates of a camera include a position of the camera. In another implementation, the spatial coordinates of a camera include an orientation of the camera.

In one implementation, each of the cameras 220, 224 is outfitted with an optical tracking system and/or a hardware encoded head. For example, camera 220 includes an optical tracking system 222 and/or a head 223, and camera 224 includes an optical tracking system 226 and/or a head 227. In one implementation, the heads 223, 227 can be an encoded head, a remote head, or a motion control system with a crane. Further, tracking systems 222, 226 and/or heads 223, 227 deliver information about the six degrees-of-freedom as well as world offsets for the cameras 220, 224. In one implementation, the tracked data from the systems 222, 223, 226, 227 are captured and/or sensed by the trackers 230, 232.

Although the tracked data coming from the systems 222, 223, 226, 227 are generally good, incoming data from one (e.g., system 222) of the systems 222, 223, 226, 227 may intermittently drop out or deviate. Thus, the drop out/deviation may otherwise cause problems if the video system 200 relies solely on data from a single tracking system or head. Therefore, the video system 200 includes multiple tracking systems 222, 223, 226, 227 and multiple trackers 230, 232 to provide redundancy. The video system 200 also includes a tracking tool 242 (or software) coupled to or situated within the processor 240 to enable the ingestion of multiple data sets from the trackers 230, 232 into a timeline with multiple tracks of camera data, along with their respective sub-tracks.

In one implementation, each track (having sub-tracks) includes following camera data. For example, a first track data includes spatial coordinates of camera 220 tracked by the tracker 230 using data coming from the optical tracking system 222. Thus, the first track data includes a first sub-track with X, Y, Z coordinates used for tracking translation from the world offset of the virtual camera, and a second sub-track with pitch, yaw, and roll axes used to track the local rotation of the virtual camera. In one implementation, the origin (or 0,0,0) of the virtual camera is the nodal point of the physical lens, or the center of the film plane. In another example, a second track data includes spatial coordinates of camera 224 tracked by the tracker 230 using data coming from the optical tracking system 226. Thus, the second track data includes a first sub-track with X, Y, Z coordinates used for tracking translation from the world offset of the virtual camera, and a second sub-track with pitch, yaw, and roll axes used to track the local rotation of the virtual camera. Additional track data can be formed similarly with the above description.

In one implementation, once all of the tracks of the camera track data have been received, the tracking tool 242 synchronizes the camera track data for each track to a time code (or frames per second). At this point, erroneous data can be recognized, smoothed, and compensated for with the data of the other tracks, or dismissed entirely. All tracks and sub-tracks also can be freely mixed into a new master track via a software solution. This also enables a bias to be applied to any one of the tracks using keyframes or other similar technique. Further, in one implementation, the above-described technique is employable for both live (i.e., real-time) and post-production. In another implementation, there is no limit on the number of systems used in combination. In an alternative implementation, various kinds of tracking system or mechanisms can be used. Any system that gives the user information about the position and rotation of the capture camera can be employed to provide additional tracking information.

In the illustrated implementation of FIG. 2A, the processor 240 is coupled to the cameras 220, 224. In one implementation, the processor 240 generates a lens profile storing lens data corresponding to the lens of each camera 220 or 224 during the shot. In one implementation, the lens data is synchronized to respective frames of the shot. In another implementation, the lens data is synchronized to a time code.

In one implementation, the processor 240 generates the lens profile and captures multiple tracks of lens data in real time during the production. The lens data includes: (1) measurement of active sensor dimensions/film plane/imager; (2) image plane distance to the nodal point; (3) focal length of the camera taking into account zoom and lens breathing; (4) lens distortion profile; (5) image center shift; (6) lens aperture; and (7) focus distance.

In one implementation, the processor 240 also includes a render engine 244 to retrace the movements of the cameras 220, 224 from the selected track(s) of the camera capture data, and mimics the lens and its characteristics, frame by frame, to replicate the shot of the subject and/or scene 210 virtually through a renderer 246.

Figure 2B:
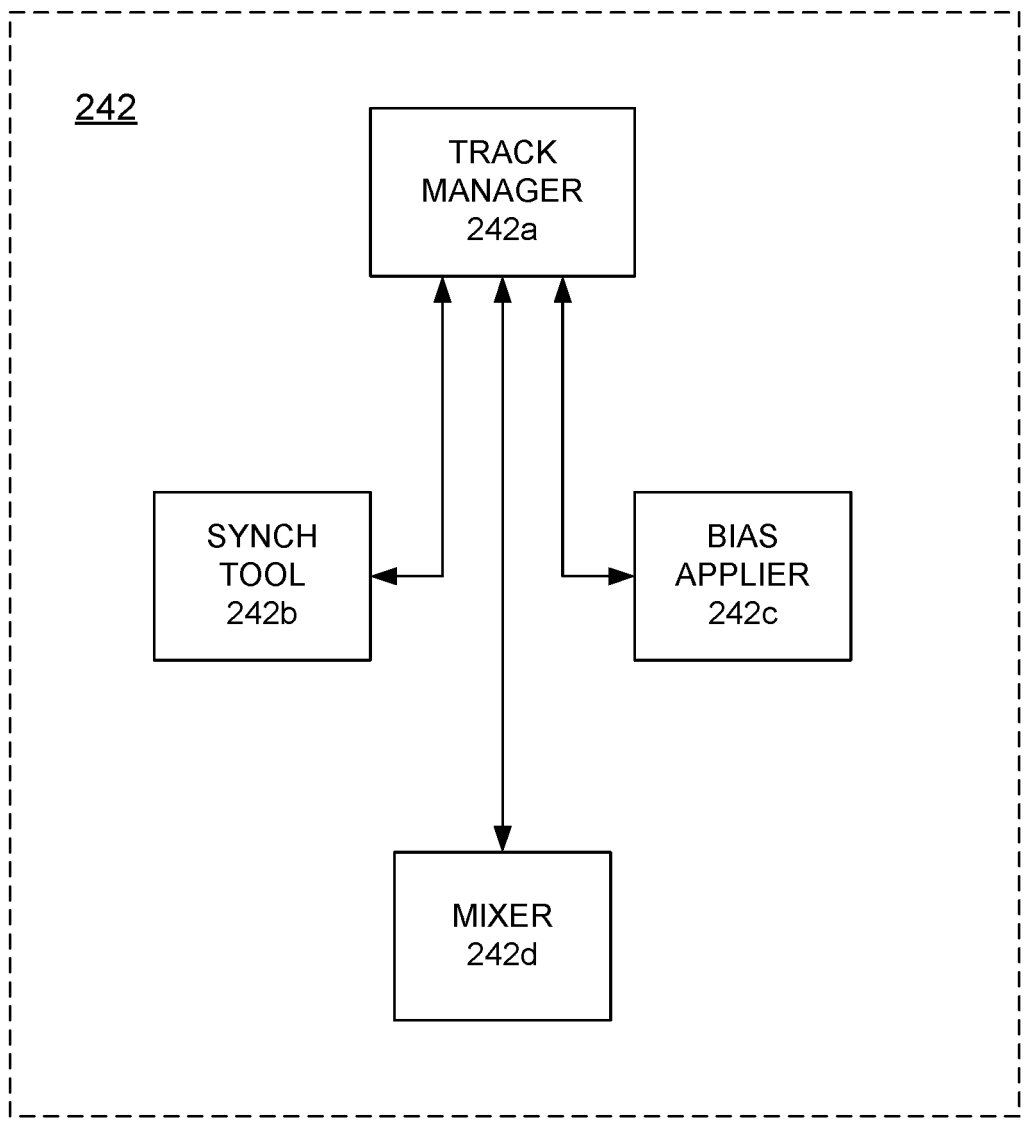
FIG. 2B is a detailed block diagram of the tracking tool in accordance with one implementation of the present disclosure.

FIG. 2B is a detailed block diagram of the tracking tool 242 in accordance with one implementation of the present disclosure. In the illustrated implementation of FIG. 2B, the tracking tool 242 includes a track manager 242a, a synchronizing tool 242b, a bias applier 242c, and a mixer 242d. In one implementation, the synchronizing tool 242b synchronizes the first tracking information and the second tracking information to a time code. In one implementation, the track manager 242a generates adjusted tracking information using the synchronized first tracking information and the synchronized second tracking information received from the synchronizing tool to smooth anomalous data in the first tracking information. In one implementation, the bias applier 242c generates an adjusted timeline by applying bias to one of the synchronized first tracking information of the first track or the synchronized second tracking information of the second track using keyframes. In one implementation, the mixer mixes the first tracking information of the first track with the second tracking information of the second track into a new master track.

Figure 2C:
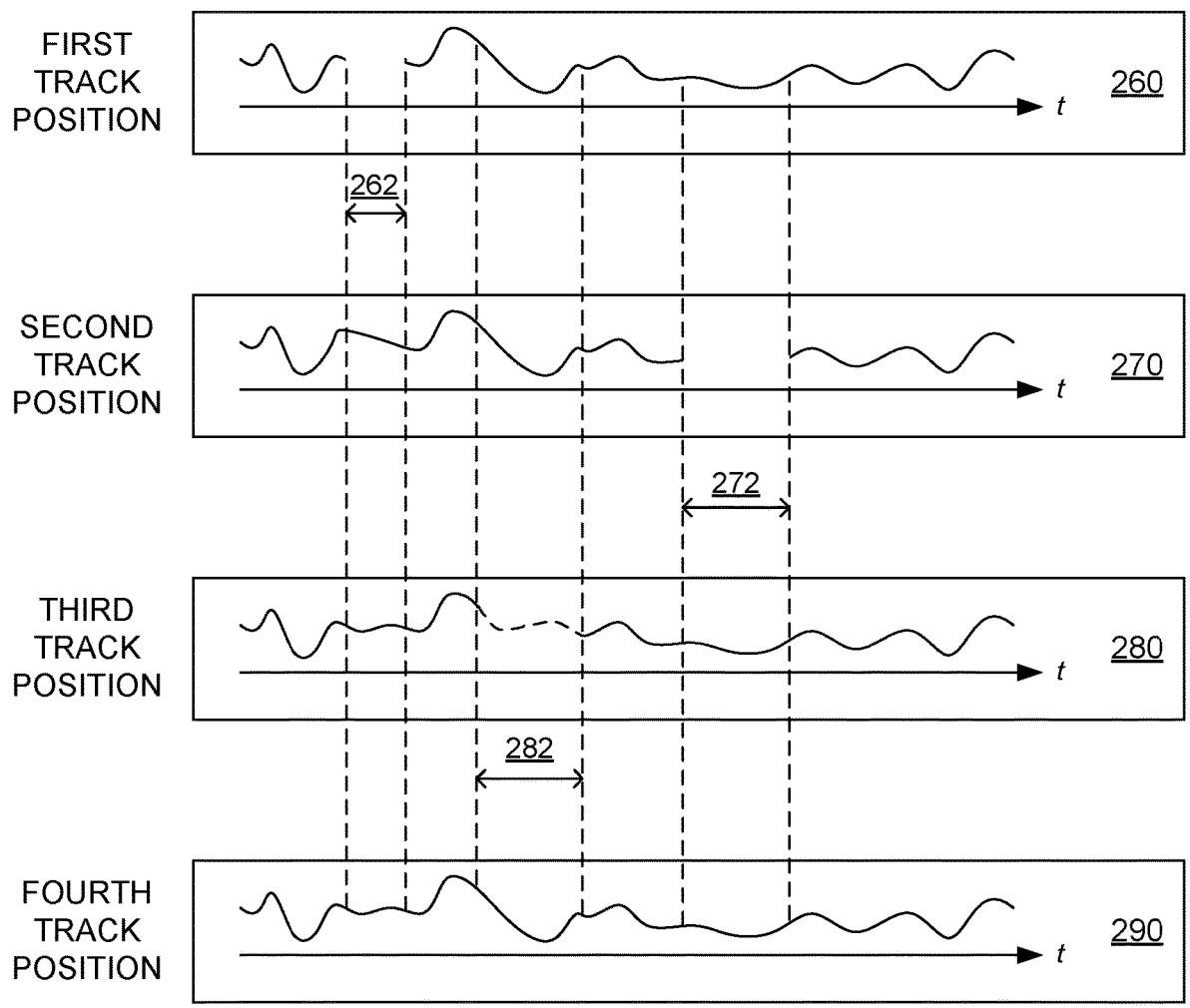
FIG. 2C is a timeline diagram of position tracking data of four tracks in accordance with one implementation of the present disclosure.

FIG. 2C is a timeline diagram 250 of position tracking data of four tracks in accordance with one implementation of the present disclosure.

In the illustrated implementation of FIG. 2C, the timeline diagram 250 shows, for example, position tracking data 260, 270, 280, 290 from four different tracking systems. The first diagram shows first track position data 260 from a first tracking system (e.g., optical tracking system 222 positioned on camera 220). The second diagram shows second track position data 270 from a second tracking system (e.g., optical tracking system 226 positioned on camera 224). The third diagram shows third track position data 280 from a third tracking system (e.g., head 223 positioned on camera 220). The fourth diagram shows fourth track position data 290 from a fourth tracking system (e.g., head 227 positioned on camera 224).

In the illustrated implementation of FIG. 2C, the first position tracking data 260 includes data dropout 262. Thus, the tracking tool 242 reviews the position tracking data 270, 280, 290 from the other tracks and determines to replace data dropout 262 with the position tracking data 280, 290 from the third or fourth track because the second tracking data 270 deviates from the data in the third or fourth track.

In the illustrated implementation of FIG. 2C, the second position tracking data 270 includes data dropout 272. Thus, the tracking tool 242 reviews the position tracking data 260, 280, 290 from the other tracks and determines to replace data dropout 272 with the position tracking data 260, 280, 290 from the first, third, or fourth track because data from the first, third, and fourth track match.

In the illustrated implementation of FIG. 2C, the third position tracking data 280 includes data deviation 282 (which deviates from tracking data on first, second, and fourth tracks). Thus, the tracking tool 242 reviews the position tracking data 260, 270, 290 from the other tracks and determines to replace data deviation 282 with the position tracking data 260, 270, or 290 from the first, second, or fourth track because data from the first, second, and fourth track match.

Figure 3A:
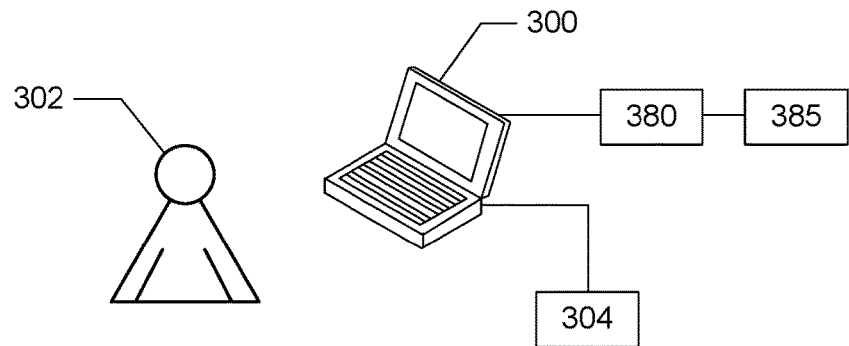
FIG. 3A is a representation of a computer system and a user in accordance with an implementation of the present disclosure.

FIG. 3A is a representation of a computer system 300 and a user 302 in accordance with an implementation of the present disclosure. The user 302 uses the computer system 300 to implement an application 390 for processing and filtering of camera tracking data as illustrated and described with respect to the method 100 in FIG. 1 and the systems 200, 250 in FIGS. 2A and 2B.

Figure 3B:
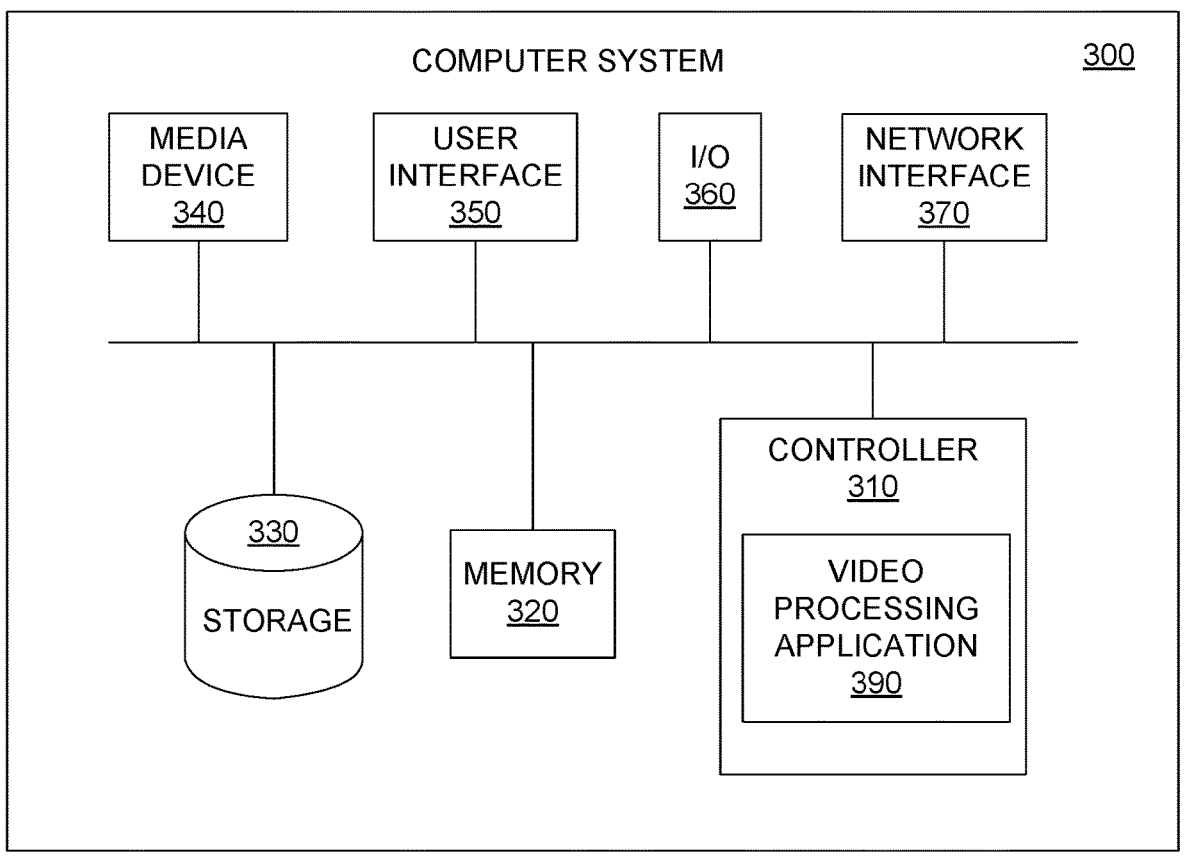
FIG. 3B is a functional block diagram illustrating the computer system hosting the video processing application in accordance with an implementation of the present disclosure.

The computer system 300 stores and executes the video processing application 390 of FIG. 3B. In addition, the computer system 300 may be in communication with a software program 304. Software program 304 may include the software code for the video processing application 390. Software program 304 may be loaded on an external medium such as a CD, DVD, or a storage drive, as will be explained further below.

Furthermore, the computer system 300 may be connected to a network 380. The network 380 can be connected in various different architectures, for example, client-server architecture, a Peer-to-Peer network architecture, or other type of architectures. For example, network 380 can be in communication with a server 385 that coordinates engines and data used within the video processing application 390. Also, the network can be different types of networks. For example, the network 380 can be the Internet, a Local Area Network or any variations of Local Area Network, a Wide Area Network, a Metropolitan Area Network, an Intranet or Extranet, or a wireless network.

FIG. 3B is a functional block diagram illustrating the computer system 300 hosting the video processing application 390 in accordance with an implementation of the present disclosure. A controller 310 is a programmable processor and controls the operation of the computer system 300 and its components. The controller 310 loads instructions (e.g., in the form of a computer program) from the memory 320 or an embedded controller memory (not shown) and executes these instructions to control the system, such as to provide processing and filtering of camera tracking data. In its execution, the controller 310 provides the video processing application 390 with a software system, such as to provide the data processing to ingest and use multiple tracks of tracking data. Alternatively, this service can be implemented as separate hardware components in the controller 310 or the computer system 300.

Memory 320 stores data temporarily for use by the other components of the computer system 300. In one implementation, memory 320 is implemented as RAM. In another implementation, memory 320 also includes long-term or permanent memory, such as flash memory and/or ROM.

Storage 330 stores data either temporarily or for long periods of time for use by the other components of the computer system 300. For example, storage 330 stores data used by the video processing application 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user of the computer system 300 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure.

Additional variations and implementations are also possible. For example, in addition to video production for virtual production (e.g., virtual reality environments), other visual effects (VFX) productions or video production can also use multiple tracking systems (e.g., video game development). Accordingly, the present disclosure is not intended to be limited to the implementations shown herein but is to be accorded the widest scope consistent with the principal and novel features disclosed herein.

All features of each of the above-discussed examples are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for video processing, comprising:
generating first tracking information using a first tracking system coupled to a camera which moves during a video sequence forming a shot including multiple frames,
wherein the first tracking information includes information about six degrees of freedom motion of the camera synchronized to the multiple frames in the shot;
generating second tracking information using a second tracking system coupled to the camera which moves during the video sequence,
wherein the second tracking information includes information about six degrees of freedom motion of the camera synchronized to the multiple frames in the shot;
generating, by a tracking tool, a timeline with a first track for the first tracking information and a second track for the second tracking information,
wherein the tracking tool is coupled to the first tracking system and the second tracking system, and receives the first tracking information and the second tracking information.

2. The method of claim 1, wherein the first tracking system is an optical tracking system.

3. The method of claim 1, wherein the second tracking system is a hardware-encoded head.

4. The method of claim 1, further comprising
mixing the first tracking information of the first track with the second tracking information of the second track into a new master track.

5. The method of claim 1, further comprising
synchronizing, by the tracking tool, the first tracking information and the second tracking information to a time code.

6. The method of claim 5, further comprising
generating, by the tracking tool, adjusted tracking information using the synchronized first tracking information of the first track and the synchronized second tracking information of the second track to smooth anomalous data in the first tracking information.

7. The method of claim 6, wherein generating adjusted tracking information comprises
generating an adjusted timeline by applying bias to one of the synchronized first tracking information of the first track or the synchronized second tracking information of the second track using keyframes.

8. The method of claim 7, wherein generating the adjusted timeline comprises adjusting the timeline in real-time.

9. The method of claim 7, wherein generating the adjusted timeline comprises adjusting the timeline post production.

10. A system for video processing, comprising:
a camera;
a first tracking system, connected to the camera, wherein the first tracking system generates first tracking information about the camera as the camera moves during a video sequence forming a shot includes multiple frames, and the first tracking information includes information about six degrees of freedom motion of the camera synchronized to frames in the shot;
a second tracking system, wherein the second tracking system generates second tracking information about the camera as the camera moves during the video sequence, and the second tracking information includes information about six degrees of freedom motion of the camera synchronized to frames in the shot;
a tracking tool connected to the first tracking system and the second tracking system, that receives the first tracking information and the second tracking information, creates a timeline with a first track for the first tracking information and a second track for the second tracking information.

11. The system of claim 10, wherein the first tracking system is an optical tracking system.

12. The system of claim 10, wherein the second tracking system is a hardware encoded head.

13. The system of claim 10, further comprising
a synchronizing tool to synchronize the first tracking information and the second tracking information to a time code.

14. The system of claim 10, further comprising
a track manager to generate adjusted tracking information using the synchronized first tracking information and the synchronized second tracking information received from the synchronizing tool to smooth anomalous data in the first tracking information.

15. The system of claim 14, further comprising
a bias applier to generate an adjusted timeline by applying bias to one of the synchronized first tracking information of the first track or the synchronized second tracking information of the second track using keyframes.

16. The system of claim 10, further comprising
a mixer to mix the first tracking information of the first track with the second tracking information of the second track into a new master track.

17. A non-transitory computer-readable storage medium storing a computer program to capture video, the computer program comprising executable instructions that cause a computer to:
generate first tracking information from tracking data received from a first tracking system coupled to a camera which moves during a video sequence forming a shot including multiple frames,
wherein the first tracking information includes information about six degrees of freedom motion of the camera synchronized to the multiple frames in the shot;
generate second tracking information from tracking data received from a second tracking system coupled to the camera which moves during the video sequence,
wherein the second tracking information includes information about six degrees of freedom motion of the camera synchronized to the multiple frames in the shot;
generate a timeline with a first track for the first tracking information and a second track for the second tracking information.

18. The non-transitory computer-readable storage medium of claim 17, further comprising executable instructions that cause the computer to
synchronize the first tracking information and the second tracking information to a time code.

19. The non-transitory computer-readable storage medium of claim 18, further comprising executable instructions that cause the computer to
generate adjusted tracking information using the synchronized first tracking information of the first track and the synchronized second tracking information of the second track to smooth anomalous data in the first tracking information.

20. The non-transitory computer-readable storage medium of claim 17, further comprising executable instructions that cause the computer to mix the first tracking information of the first track with the second tracking information of the second track into a new master track.

\* \* \* \* \*